(12) United States Patent
Tanoue

(10) Patent No.: US 7,203,510 B2
(45) Date of Patent: Apr. 10, 2007

(54) CDMA MOBILE COMMUNICATION SYSTEM IN WHICH UPDATING OF A REFERENCE VALUE FOR CONTROLLING CLOSED-LOOP TRANSMISSION POWER IS REALIZED IN A BASE TRANSCEIVER STATION

(75) Inventor: Katsumi Tanoue, Tokyo (JP)

(73) Assignee: NEC Corporation, Tokyo (JP)

( * ) Notice: Subject to any disclaimer, the term of this patent is extended or adjusted under 35 U.S.C. 154(b) by 368 days.

(21) Appl. No.: 10/418,992

(22) Filed: Apr. 19, 2003

(65) Prior Publication Data
US 2004/0203993 A1    Oct. 14, 2004

(30) Foreign Application Priority Data
Apr. 24, 2002    (JP)    .............................. 2002-122316

(51) Int. Cl.
*H04B 7/00* (2006.01)
*H04Q 7/20* (2006.01)

(52) U.S. Cl. ................ 455/522; 455/226.3; 455/69.13; 455/127.1; 370/320; 370/335

(58) Field of Classification Search ................ 455/522, 455/226.1, 342, 127.1, 226.3, 341, 334, 500, 455/69.11, 69.13; 370/320, 335, 318, 322, 370/333
See application file for complete search history.

(56) References Cited

U.S. PATENT DOCUMENTS

| | | | |
|---|---|---|---|
| 6,728,227 B1 * | 4/2004 | Ohtani et al. ................ | 370/331 |
| 6,731,949 B2 * | 5/2004 | Hamabe et al. ............. | 455/522 |
| 6,757,319 B1 * | 6/2004 | Parsa et al. .................. | 375/141 |
| 6,765,897 B2 * | 7/2004 | Cordier et al. .............. | 370/342 |
| 6,810,246 B1 * | 10/2004 | Kalofonos et al. .......... | 455/423 |
| 6,823,193 B1 * | 11/2004 | Persson et al. ............. | 455/522 |
| 6,879,813 B2 * | 4/2005 | Reznik .................... | 455/67.11 |
| 6,934,268 B1 * | 8/2005 | Hedlund et al. ............ | 370/311 |
| 6,944,471 B2 * | 9/2005 | Qin et al. .................... | 455/522 |

FOREIGN PATENT DOCUMENTS

| | | |
|---|---|---|
| CN | 1304586 A | 7/2001 |
| EP | 0 680 160 A2 | 11/1995 |
| EP | 1 311 076 A1 | 5/2003 |
| JP | 10-112683 | 4/1998 |

(Continued)

*Primary Examiner*—Edan Orgad
(74) *Attorney, Agent, or Firm*—Michael Best & Friedrich LLP

(57) ABSTRACT

A CDMA mobile communication system is disclosed in which a reference value, an uplink signal SIR value, which is used in a closed-loop transmission power control is updated in base transceiver stations. The uplink signal target SIR value is updated independently at base transceiver stations and not at the base station controller. At the base transceiver station, when a decoder detects a loss of synchronization of a user signal from a mobile station, a demodulator adds a step value ΔSIR that has been set in advance to the uplink signal SIR value that has been reported from the base station controller to obtain an uplink signal target SIR provisional value. When this uplink signal target SIR provisional value is smaller than an uplink signal target SIR maximum value that has been set in advance, the uplink signal target SIR value is updated to the uplink signal target SIR provisional value.

3 Claims, 9 Drawing Sheets

FOREIGN PATENT DOCUMENTS

| | | |
|---|---|---|
| JP | 2000-307511 | 11/2000 |
| JP | 2001-217770 | 8/2001 |
| JP | 2001-244878 | 9/2001 |
| JP | 2001-285193 | 10/2001 |
| WO | WO 00/36762 | 6/2000 |

* cited by examiner

CDMA MOBILE COMMUNICATION SYSTEM IN WHICH UPDATING OF A REFERENCE VALUE FOR CONTROLLING CLOSED-LOOP TRANSMISSION POWER IS REALIZED IN A BASE TRANSCEIVER STATION

BACKGROUND OF THE INVENTION

1. Field of the Invention

The present invention relates to a method of controlling transmission power in a CDMA mobile communication system, and more particularly to a method of controlling the uplink outer-loop transmission power for updating the reference value used in closed-loop transmission power control.

2. Description of the Related Art

FIG. 1 is a block diagram showing the configuration of a CDMA communication system. As shown in FIG. 1, this CDMA communication system is composed of mobile station (MS) 11, base transceiver stations (BTS) 112 and 113, base station controller (BSC) 14 for controlling these base transceiver stations 112 and 113, and mobile switching center (MSC) 15.

Mobile station 11 communicates with base transceiver station 112 and base transceiver station 113 by means of radio signals. Base transceiver stations 112 and 113 are connected to base station controller 14 by way of wired lines 16, and base station controller 14 is further connected to mobile switching center 15 by way of wired line 17. In FIG. 1, communication with mobile station 11 is realized by means of diversity hand-over, and signals from mobile station 11 are received at both base transceiver station 112 and base transceiver station 113 and then combined at base station controller 14. Signals from mobile switching center 15 are split at base station controller 14, transmitted simultaneously from base transceiver station 112 and base transceiver station 113, and then combined at mobile station 11.

In a CDMA mobile communication system, code division multiplexing technology enables simultaneous communication between a plurality of mobile stations and base transceiver stations on the same frequency. However, because communication between a particular mobile station and a particular base transceiver station can cause interference for other mobile stations, the mobile station and the base transceiver station constantly instruct the partner station to increase or decrease the transmission power so as to maintain the reception quality at its own station at a value that has been set in advance. This method of controlling the transmission power is referred to as "closed-loop transmission power control," and the reception quality in closed-loop transmission power control is determined by, for example, the Signal-to-Interference power Ratio (hereinbelow abbreviated as SIR).

With reference to FIG. 2, a closed-loop transmission power control method in a CDMA communication system will be described. FIG. 2 shows radio signal formats in a W-CDMA communication system, these being radio signal format 21 of a downlink channel from a base transceiver station to a mobile station and radio signal format 22 of an uplink channel from a mobile station to a base transceiver station. These radio signal formats 21 and 22 contain pilot signals 23 and 25, and further, contain TPC signals 24 and 26 for instructing the partner station to increase or decrease the transmission power. The base transceiver station and mobile station use pilot signals 23 and 25 to measure the SIR of the communication, and use TPC signals 24 and 26 to instruct the partner station to increase or decrease the transmission power in order to approach the target value that was instructed beforehand by the base station controller. More specifically, the mobile station calculates the SIR from pilot signal 23 in interval 27 and causes the result to be reflected in TPC signal 24, and the base transceiver station similarly calculates the SIR from pilot signal 25 in interval 28 and causes the results to be reflected in TPC signal 26.

In a CDMA mobile communication system, a user signal at the time of hand-over is combined in the base station controller, which is the host device of a base transceiver station. This type of hand-over method is referred to as a "soft hand-over." The base station controller determines the reception quality of the user signal following combining by soft hand-over, determines whether the reception quality satisfies a target reception quality level that has been set in advance for the service, such as voice service, that is being provided to the user, and updates the SIR target value for the appropriate base transceiver station so as to maintain the target reception quality level. This method of controlling the transmission power is referred to as "outer-loop transmission power control," and the reception quality that is measured by the base station controller is, for example, Block Error Rate (BLER).

FIG. 3 shows the construction of base station controller 14 that is shown in FIG. 1. As shown in FIG. 3, base station controller 14 is provided with BLER measurement unit 31, data adder 32, distribution unit 33, selective synthesizer 34, target SIR calculation unit 35, and central control unit 36.

In this base station controller 14, users' signals from base transceiver stations 112 and 113 undergo a synthesizing process in selective synthesizer 34 for signals from the same mobile station. In this synthesizing process, the user signals are subjected to a statistical process over a plurality of radio frames. The BLER of the user signal after carrying out this combining process is then measured at BLER measurement unit 31.

The BLER that was measured at BLER measurement unit 31 is then compared with the target BLER that was set by means of central control unit 36 at target SIR calculation unit 35, and the value of the target SIR of the uplink signal that is the reference in closed-loop transmission power control is then calculated based on the results of comparison. More specifically, target SIR calculation unit 35 performs a process for increasing the target SIR value of the uplink signal when the BLER that has been measured by BLER measurement unit 31 is equal to or lower than the target BLER that has been set by means of central control unit 36, and performs a process for decreasing the target SIR value of the uplink signal when the BLER that has been measured by BLER measurement unit 31 is greater than the target BLER that has been set by means of central control unit 36.

The target SIR value of the uplink signal that has been calculated by target SIR calculation unit 35 is contained in data that are transmitted by data adder 32 to each base transceiver station, and this target SIR value is transmitted to, for example base transceiver stations 112 and 113 by way of distribution unit 33. Base transceiver station 112 and base transceiver station 113 subsequently execute control of the closed-loop transmission power in accordance with the target SIR value of the uplink signal that has been reported from base station controller 14.

The uplink (in the direction from a mobile station to a base transceiver station) radio signal outer-loop transmission power control system in a CDMA communication system of the prior art will be next explained with reference to FIG. 4. In FIG. 4, the communication with mobile station 11 takes place during a diversity hand-over where mobile station 11 is communicating with base transceiver station 112 and base transceiver station 113. The uplink user signal from mobile station 11 is received by base transceiver station 112 and base transceiver station 113, and this user signal is transmitted from each of base transceiver stations 112 and 113 to base station controller 14.

Upon receiving the user signals from base transceiver stations 112 and 113 in step 61, base station controller 14 performs a synthesizing process in selective synthesizing unit 34 as shown in FIG. 3. In this process of combining user signals, a statistical process is carried out over a plurality of radio frames in steps 62 and 63, following which the uplink signal target SIR value is calculated in target SIR calculation unit 35 in step 64. The results of this calculation are then reported to base transceiver station 112 and base transceiver station 113 by means of an uplink signal target SIR report message. Base transceiver stations 112 and 113 subsequently execute closed-loop transmission power control using, as a reference, the uplink signal target SIR value that was reported by means of the uplink signal target SIR report message. Simultaneously execution of the above-described closed-loop transmission power control method and outer-loop transmission power control method in a CDMA mobile communication system maintains the transmission power of mobile stations and base transceiver stations at optimum levels.

However, the outer-loop transmission power control method involves a considerable amount of processing time due to the use of the block error rate as the reception quality as well as the measurement of the quality of the user's data following combining in the base station controller, and as a result, the uplink signal target SIR value that serves as the reference value in closed-loop transmission power control cannot be set to a base transceiver station at high speed. This inability results in inadequate management of instantaneous changes in the communication environment such as sudden changes in the fading environment of radio communication, and a consequent potential for the occurrence of deterioration in communication quality such as interruptions to communication.

SUMMARY OF THE INVENTION

It is an object of the present invention to provide a method of controlling transmission power in a CDMA mobile communication system for implementing outer-loop transmission power control at high speed and thus allow management of instantaneous changes in the communication environment.

To achieve the above-described object in the transmission power control method of the present invention, a base transceiver station, upon detecting a loss of synchronization of a user signal from a mobile station, adds a predetermined step value $\Delta$SIR to the uplink signal target SIR value that has been reported from the base station controller and makes the result an uplink signal target SIR provisional value. If this uplink signal target SIR provisional value is smaller than an uplink target SIR maximum value that has been set in advance, the base transceiver station then updates the uplink signal target SIR value that serves as the reference for closed-loop transmission power control to the uplink signal target SIR provisional value.

According to the present invention, the uplink signal target SIR value is updated independently in the base transceiver station and not by means of the base station controller, whereby the uplink outer-loop transmission power control method for updating the uplink signal target SIR value that serves as the reference value in closed-loop transmission power control can be executed at high speed. The present invention can therefore deal with instantaneous changes in the communication environment such as sudden changes in the fading environment of radio communication, and can prevent the occurrence of deterioration in communication quality such as interruptions in communication.

In addition, the transmission power control method of the present invention may further include steps of:

comparing the above-described uplink signal target SIR provisional value with a value obtained by adding the uplink signal target SIR value (RNC: Radio Network Controller) that is set from the base station controller to a preset threshold value a that has been set in advance;

transmitting an uplink signal target SIR value update message to the base station controller when the above-described uplink signal target SIR provisional value is greater than the value obtained by adding the uplink signal target SIR value (RNC) that has been set from the base station controller to threshold value $\alpha$; and upon receiving an uplink signal target SIR value report message from the base station controller, updating the uplink signal target SIR value that serves as the reference in closed-loop transmission power control to the new uplink signal target SIR value (RNC) that has been reported by the uplink signal target SIR value report message.

According to the present invention, when the uplink signal target SIR value that serves as the reference in closed-loop transmission power control is equal to or greater than a value that is obtained by adding the uplink signal target SIR value (RNC) that was set by the base station controller to threshold value $\alpha$, the uplink signal target SIR value that serves as the reference for closed-loop transmission power control is updated in the base transceiver station to a new uplink signal target SIR value (RNC) that has been calculated in the base station controller. The present invention can therefore prevent a base transceiver station from requesting a mobile station for excessive uplink transmission power when in the diversity hand-over state, and moreover, when good reception quality is being obtained at another base transceiver station.

The above and other objects, features, and advantages of the present invention will become apparent from the following description with reference to the accompanying drawings, which illustrate examples of the present invention.

DETAILED DESCRIPTION OF THE PREFERRED EMBODIMENTS

First Embodiment

Figure 1:
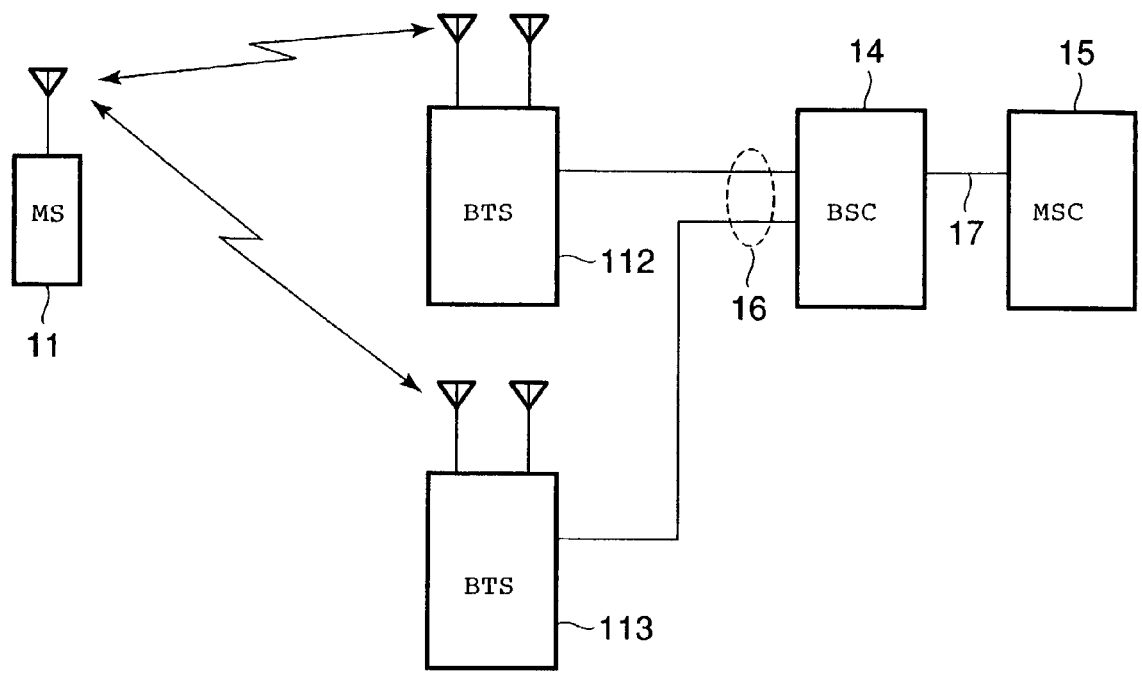
FIG. 1 is a block diagram showing the construction of a CDMA communication system.
Figure 5:
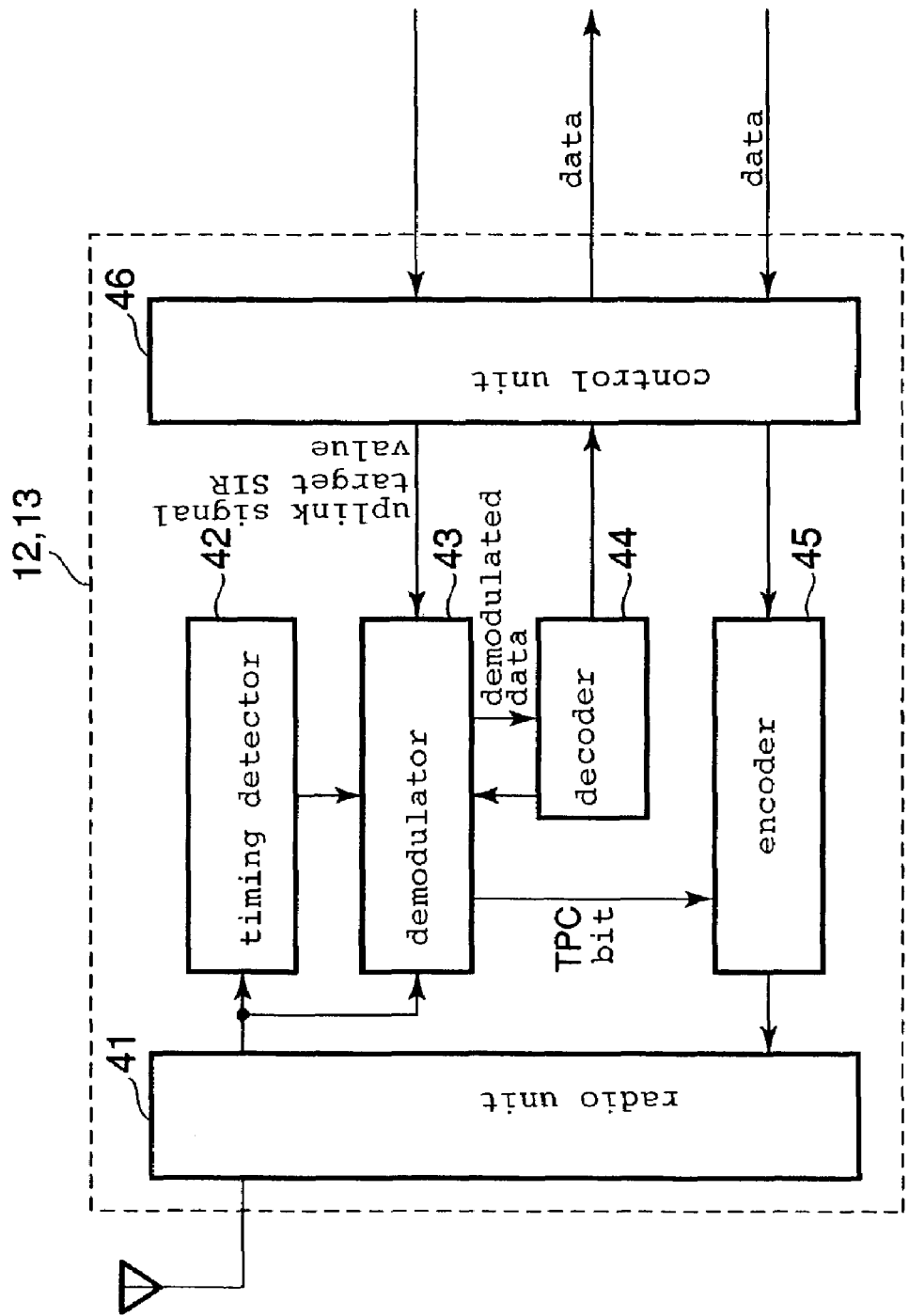
FIG. 5 is a block diagram showing the construction of a base transceiver station in the CDMA communication system of the first embodiment of the present invention.

A CDMA communication system for implementing the transmission power control of the first embodiment of the present invention is a construction in which base transceiver stations 112 and 113 in the CDMA communication system of the prior art that was shown in FIG. 1 are replaced by base transceiver stations 12 and 13 as shown in FIG. 5.

As shown in FIG. 5, each of base transceiver stations 12 and 13 in the CDMA communication system of the present embodiment are composed of radio unit 41, timing detector 42, demodulator 43, decoder 44, encoder 45, and control unit 46.

Radio unit 41 generates a baseband signal from radio signals that are received from mobile station 11, and after implementing A/D conversion, supplies the result to timing detector 42 and demodulator 43. In addition, radio unit 41 transmits signals from encoder 45 to mobile station 11.

Timing detector 42 generates a delay profile based on the signal from radio unit 41 to detect the path timing, which is the timing at which spreading was carried out at mobile station 11, and reports the results to demodulator 43.

Demodulator 43 performs a demodulation process for despreading the signal from radio unit 41 based on the path timing that has been detected by timing detector 42 and supplies the obtained demodulation data to decoder 44. In addition, demodulator 43 controls the closed-loop transmission power using as a reference the uplink signal target SIR value that is reported by means of an uplink signal target SIR message that has been received from base station controller 14 by way of control unit 46, and supplies the result as TPC bits to encoder 45. Demodulator 43 functions as an updating means that uses an uplink signal target SIR message from base station controller 14 for updating the uplink signal target SIR value that serves as the reference of closed-loop transmission power control.

Decoder 44 decodes the demodulated data from demodulator 43 and supplies the obtained data to base station controller 14 by way of control unit 46. Decoder 44 of the present embodiment also functions as a synchronization loss detection means that, upon detecting loss of synchronization of the user signal from mobile station 11, reports this loss to demodulator 43.

Encoder 45 inserts TPC bits from demodulator 43 into the data that are received from base station controller 14 by way of control unit 46 and then carries out an encoding process and supplies the result to radio unit 41.

Figure 6:
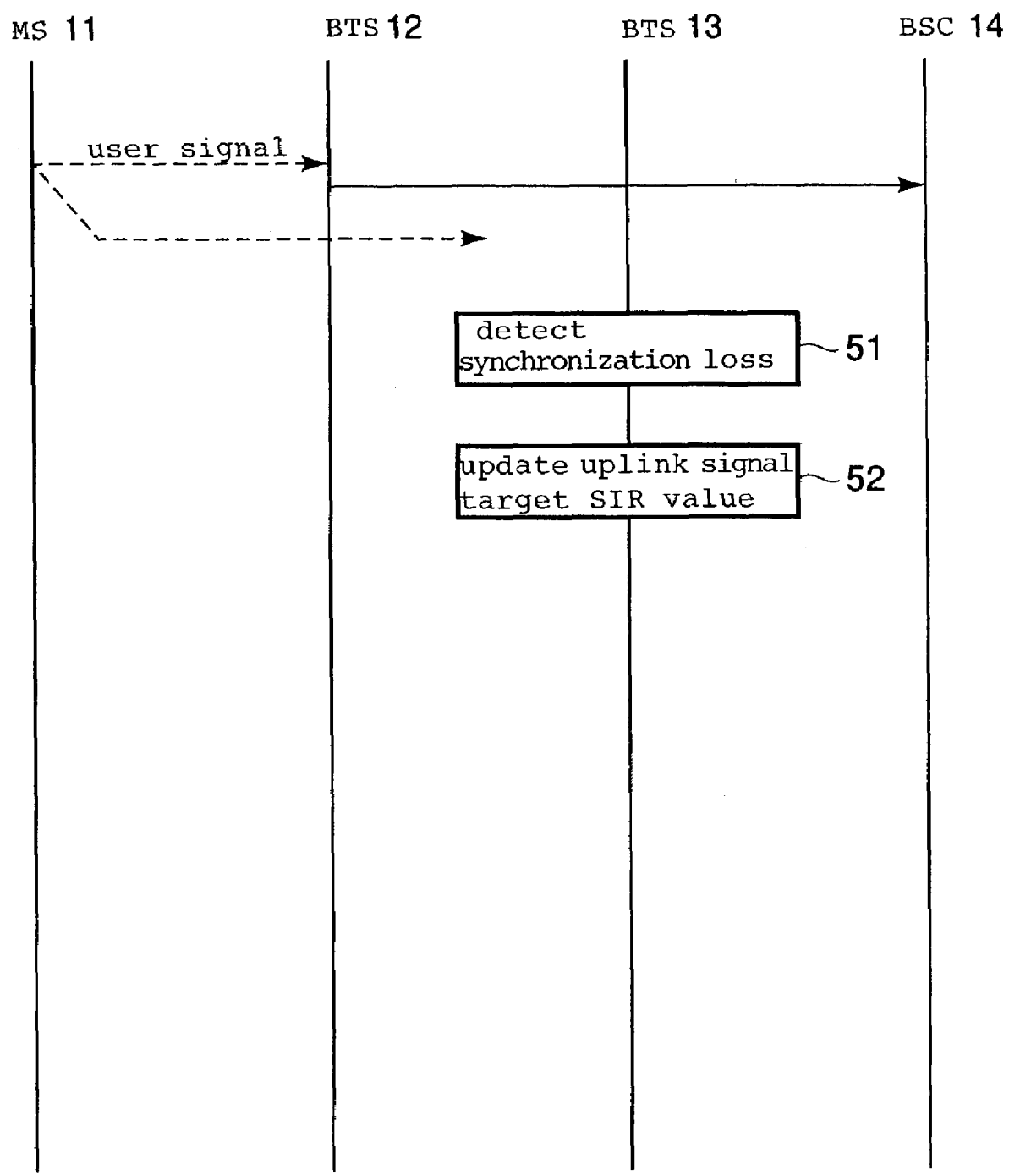
FIG. 6 is a sequence chart showing the transmission power control method of the first embodiment of the present invention.

FIG. 6 is a sequence chart showing the outer-loop transmission power control method of the first embodiment of the present invention, and as an example, shows the control that is implemented in base transceiver station 13. Here, it is assumed that the radio communication with base transceiver station 11 is in a diversity hand-over state and is carried out simultaneously in base transceiver station 12 and base transceiver station 13. It is further assumed in the following explanation that, due to instantaneous deterioration of the communication environment, the user signal from mobile station 11 reaches base transceiver station 12 but does not reach base transceiver station 13.

The user signal from mobile station 11 arrives at base transceiver station 12, and base transceiver station 12 therefore sends this user signal to base station controller 14. However, because the uplink radio signal from mobile station 11 does not arrive at base transceiver station 13, decoder 44 in base transceiver station 13 detects a loss of radio synchronization in step 51. As a result, base transceiver station 13 in this embodiment independently updates the uplink signal target SIR value that serves as the reference value in closed-loop transmission power control in step 52 without waiting for instructions from base station controller 14.

Figure 7:
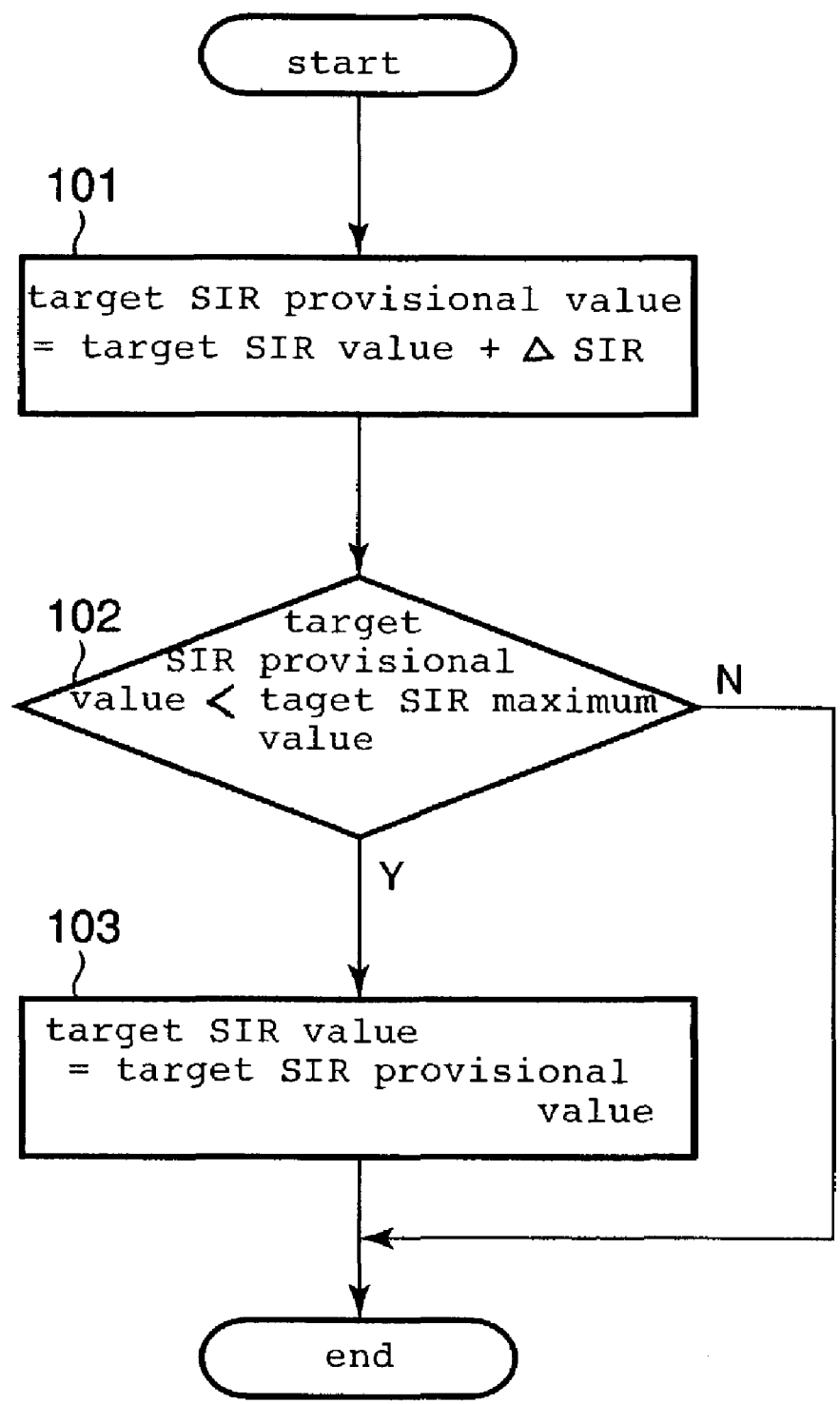
FIG. 7 is a flow chart showing the control that is realized in step 52 in FIG. 6.

The details of this process of updating the uplink signal target SIR value that is carried out in step 52 Will be next explained with reference to the flow chart of FIG. 7.

Demodulator 43 of base transceiver station 13 first adds update step (ΔSIR) that was set in advance from, for example, base station controller 14 to the current uplink signal target SIR value to calculate an uplink signal target SIR provisional value in step 101. More specifically, the uplink signal target SIR provisional value is calculated by the following equation:

uplink signal target SIR provisional value=current uplink signal target SIR value+ΔSIR In step 102, demodulator 43 in base transceiver station 13 next compares the uplink signal target SIR maximum value that was set beforehand from, for example, base station controller 14 with the uplink signal target SIR provisional value that was calculated in step 101. This comparison is carried out with the object of preventing a request to mobile station 11 for excessive transmission power.

If the uplink signal target SIR provisional value is smaller than the uplink signal target SIR maximum value in step 102, demodulator 43 of base transceiver station 13 sets this uplink signal target SIR provisional value as the uplink signal target SIR value that serves as the reference value in closed-loop transmission power control in step 103. If the uplink signal target SIR provisional value is equal to or greater than the uplink signal target SIR maximum value in step 102, demodulator 43 of base transceiver station 13 maintains the current uplink signal target SIR value without updating uplink signal target SIR value.

In the foregoing explanation, the update step (ΔSIR) and the uplink signal target SIR maximum value are reported to base transceiver station 13 by base station controller 14 or by some other means.

Figure 4:
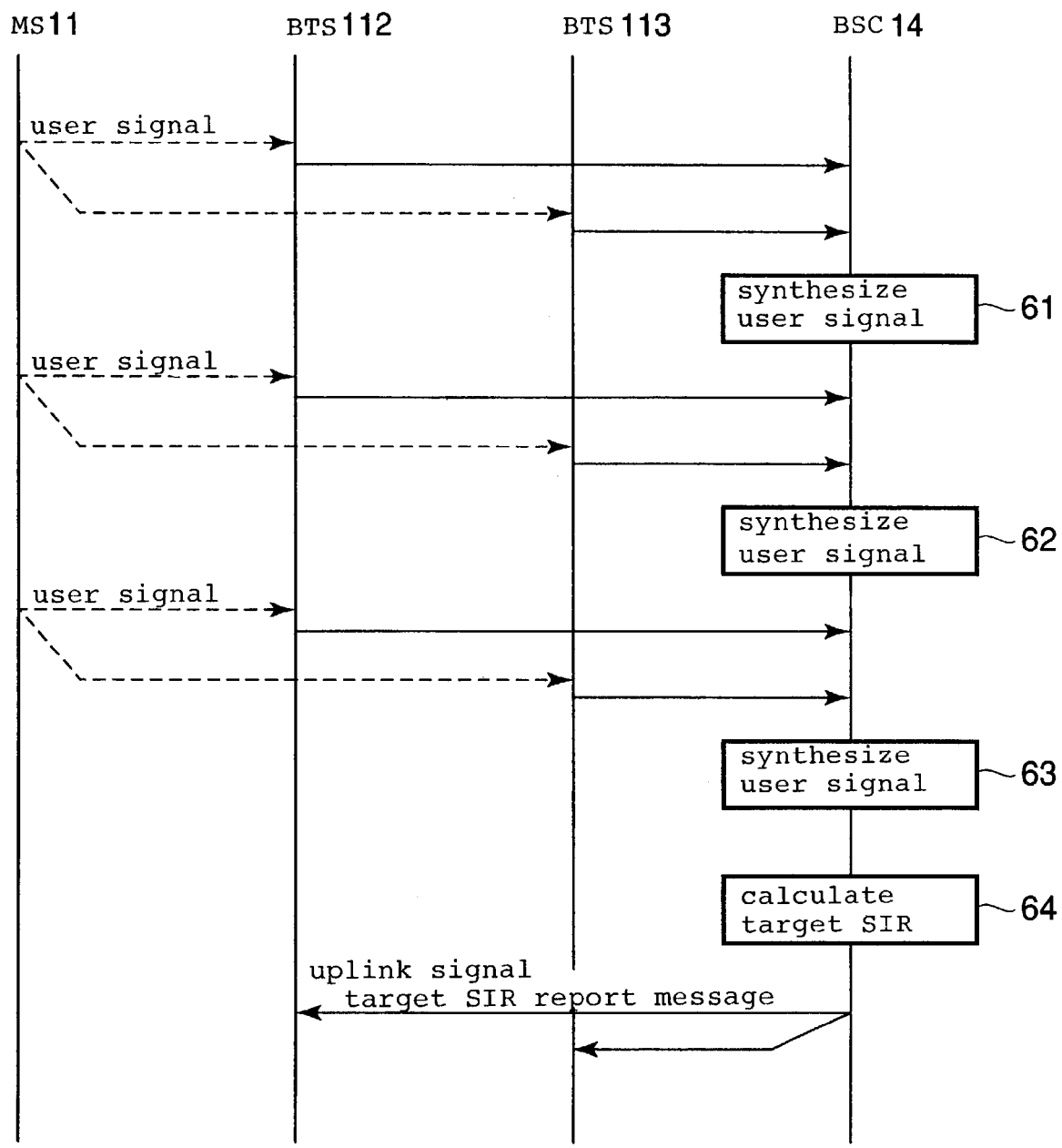
FIG. 4 is a sequence chart for explaining outer-loop transmission power control.

Although a case was used in the foregoing explanation in which updating of the uplink signal target SIR value was carried out in base transceiver station 13, the process of updating the uplink signal target SIR value is implemented in all base transceiver stations that are in the diversity hand-over state, such as base transceiver station 12. The outer-loop transmission power control of the prior art that is carried out in base station controller 14 as shown in FIG. 4 may also be executed at the same time.

According to the transmission power control method of the present embodiment, updating of the uplink signal target SIR value is carried out independently in base transceiver station 13 and is not carried out in base station controller 14, and as a result, the uplink outer-loop transmission power control method for updating the uplink signal target SIR value that serves as the reference value in closed-loop transmission power control can be carried out at high speed.

The present embodiment can therefore deal with instantaneous changes in the communication environment such as sudden changes in the fading environment of the radio communication, and can prevent the occurrence of deterioration in communication quality such as interruptions of communication.

As an example, the transmission power control method of the prior art in which updating of the uplink signal target SIR value was carried out in base station controller 14 allowed updating of the uplink signal target SIR value to be carried out at a frequency ranging from only 0.1 times/second to 1 time/second. In contrast, the transmission power control method of the present embodiment enables updating of the uplink signal target SIR value at a frequency of approximately 10 times/second when the synchronization is checked every 100 ms.

Second Embodiment

Explanation next regards the transmission power control method of the second embodiment of the present invention.

In the transmission power control method of the above-described first embodiment, updating of the uplink signal target SIR value is carried out in the base transceiver stations independent of the base station controller, but there are some cases in which, in the diversity hand-over state, a base transceiver station in which the reception quality is poor will issue a request to the mobile station for excessive uplink transmission power even though the reception state is good in another base transceiver station. The present embodiment is directed toward preventing the occurrence of this problem.

Figure 8:
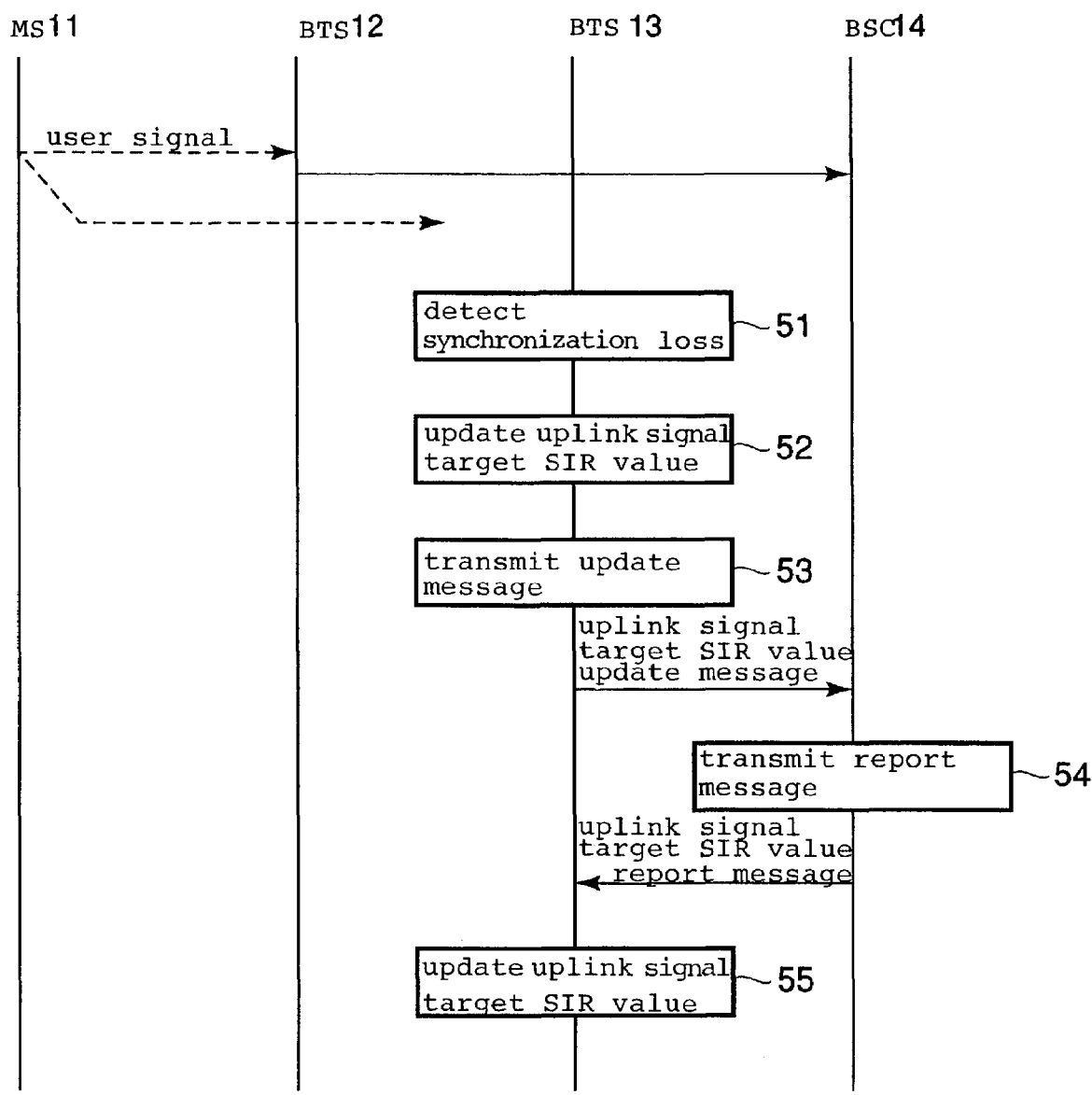
FIG. 8 is a sequence chart showing the transmission power control method of the second embodiment of the present invention.

FIG. 8 shows the type of processing that is performed in base transceiver stations 12 and 13 and base station controller 14 in this embodiment. FIG. 8 is a sequence chart showing the transmission power control method of the present embodiment. Processing as far as steps 51 and 52 is the same as shown in the sequence chart shown in FIG. 6 and explanation regarding this processing is therefore here omitted.

In the transmission power control method of the present embodiment, the uplink signal target SIR value is updated in base transceiver station 13, and when the updated uplink signal target SIR value is greater than a prescribed value, an uplink signal target SIR value update message is sent from base transceiver station 13 to base station controller 14 in step 53.

Figure 9:
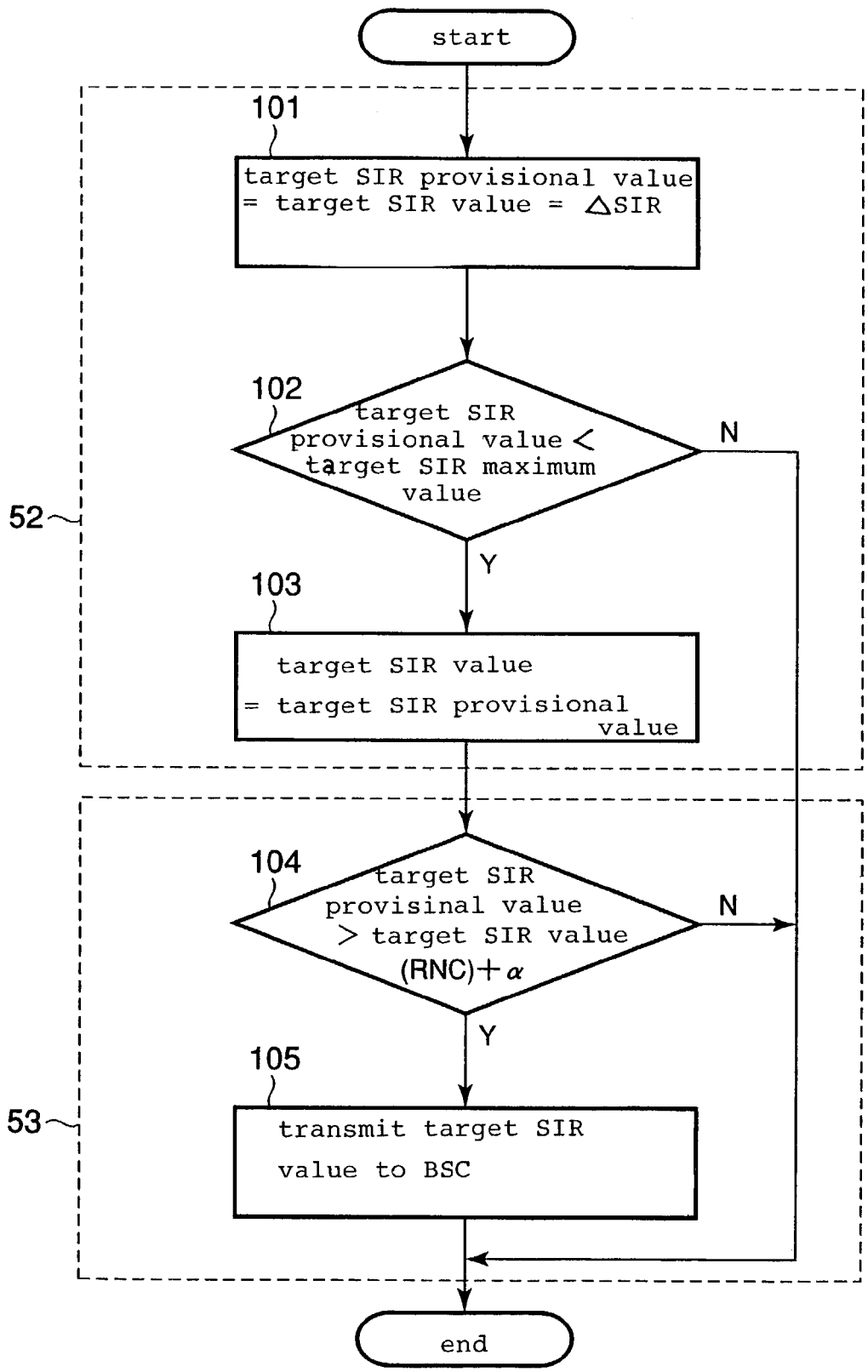
FIG. 9 is a flow chart showing the control that is realized in steps 52 and 53 in FIG. 8.
Figure 10:
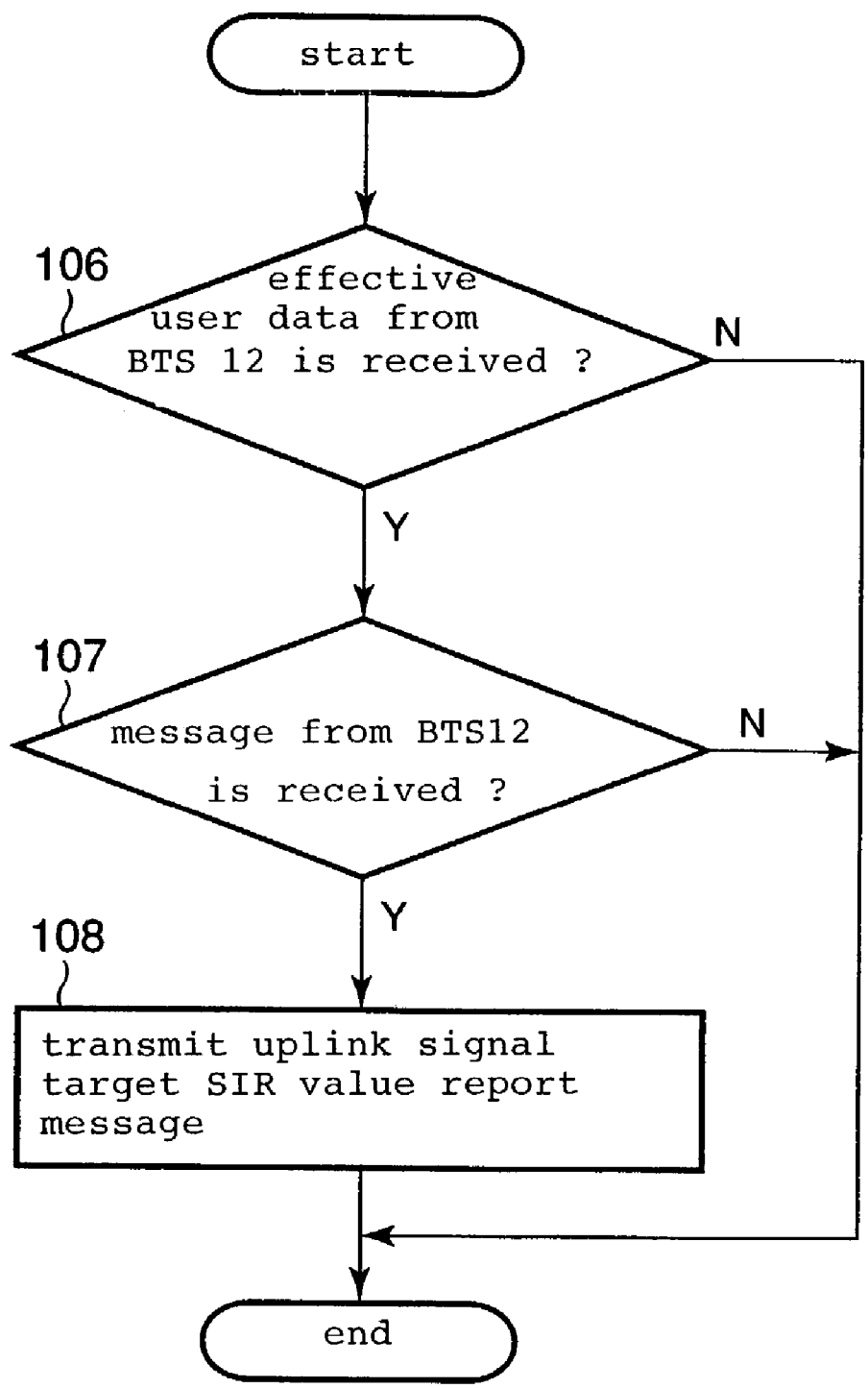
FIG. 10 is a flow chart showing the control that is realized in step 54 of FIG. 8.

With reference to the flow chart of FIG. 9, the details of the processing of this step 53 as well as the process of step 52 will be explained below.

When the uplink signal target SIR value is updated to the uplink signal target SIR provisional value in step 103, this uplink signal target SIR provisional value is compared in step 104 with a value that is obtained by adding the uplink signal target SIR value (RNC) that was set from base station controller 14 to a threshold value α. If the uplink signal target SIR provisional value is greater than the value obtained by adding the uplink signal target SIR value (RNC) to threshold value a in step 104, base transceiver station 13 sends an uplink signal target SIR value update message to base station controller 14 in step 105. Upon receiving this uplink signal target SIR value update message, base station controller 14 performs a process for sending an uplink signal target SIR value report message in step 54, as shown in FIG. 8.

Figure 2:
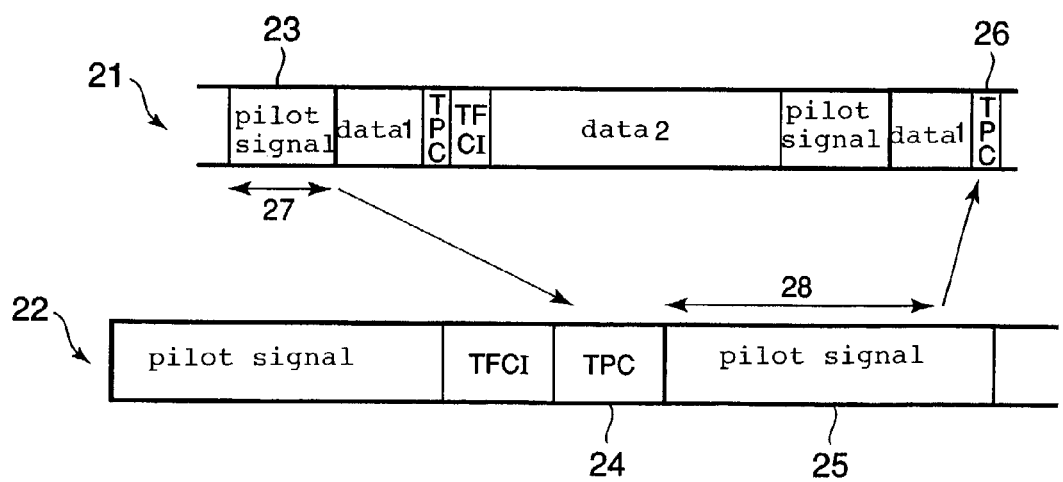
FIG. 2 shows the format of radio signals in a W-CDMA communication system.
Figure 3:
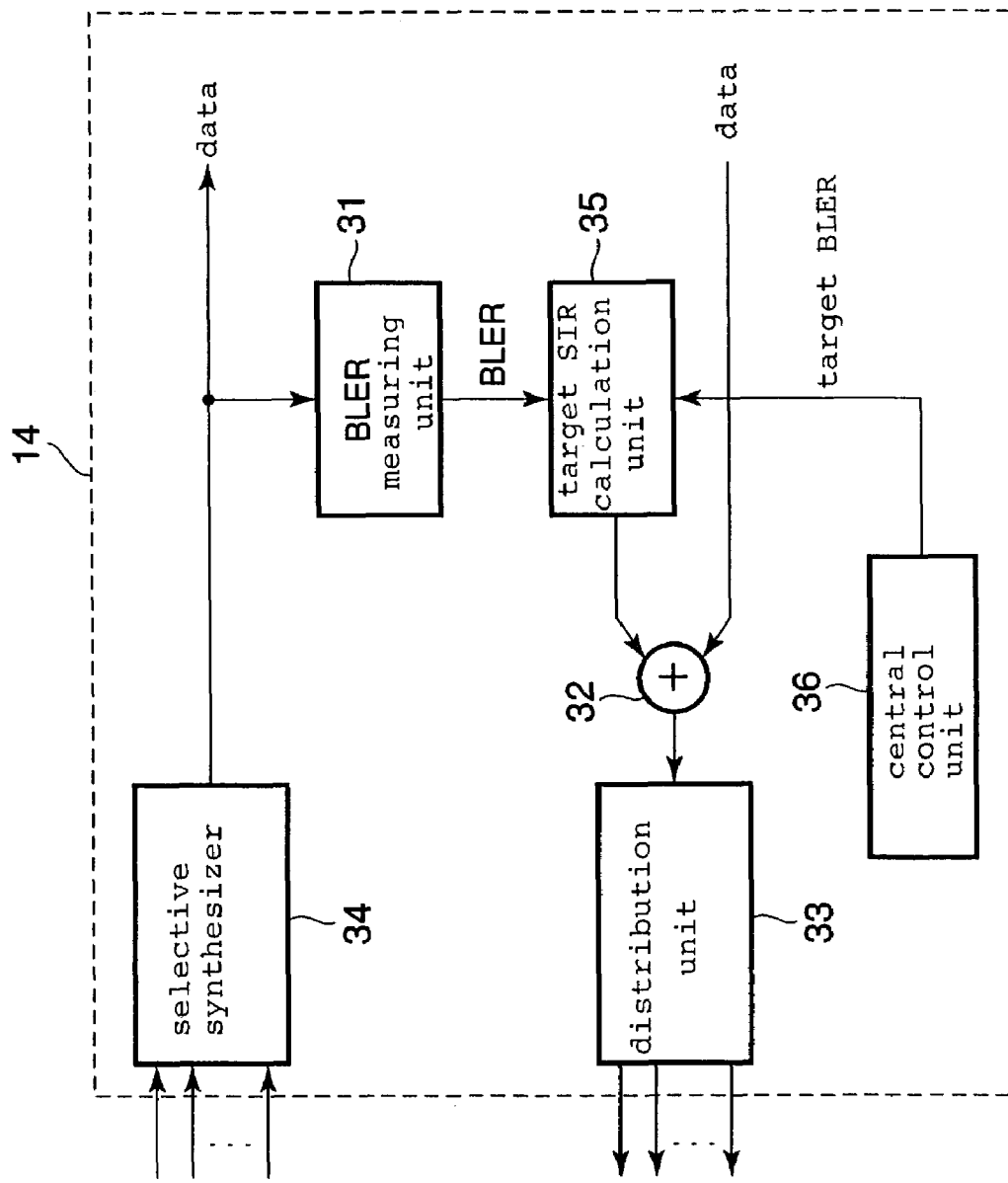
FIG. 3 is a block diagram showing the construction of base station controller 14 in FIG. 1.

The details of this process of sending an uplink signal target SIR value report message that is carried out in step 54 will be next explained with reference to FIG. 2. Upon receiving the uplink signal target SIR value update message from base transceiver station 13, base station controller 14 first determines in step 106 whether or not effective user's data can be received from base transceiver station 12, which is in the diversity hand-over state. If base station controller 14 determines in step 106 that effective user's data can be received from base transceiver station 12, base station controller 14 further checks in step 107 whether an uplink signal target SIR value update message has not been received from base transceiver station 12. If base station controller 14 determines in step 107 that an uplink signal target SIR value update message has not been received from base transceiver station 12, base station controller 14 then uses uplink signal target SIR value report message to report the uplink signal target SIR value (RNC) that was calculated in base station controller 14 to base transceiver station 13 in step 108.

In step 55, base transceiver station 13, having received the uplink signal target SIR value report message from base station controller 14, sets the uplink signal target SIR value that serves as the reference in closed-loop transmission power control to this uplink signal target SIR value (RNC), as shown in FIG. 8.

According to the above-described operations, when the uplink signal target SIR value that serves as the reference in closed-loop transmission power control at base transceiver station 13 is equal to or greater than a value obtained by adding threshold value α to the uplink signal target SIR value (RNC) that was set by base station controller 14, the uplink signal target SIR value that serves as the reference of the closed-loop transmission power control is updated to the new uplink signal target SIR value (RNC) that was calculated in base station controller 14. The present embodiment thus can prevent base transceiver station 13 from requesting mobile station 11 for excessive uplink transmission power when in the diversity hand-over state, and moreover, when the reception quality of base transceiver station 12 is good.

While preferred embodiments of the present invention have been described using specific terms, such description is for illustrative purposes only, and it is to be understood that changes and variations may be made without departing from the spirit or scope of the following claims.

What is claimed is:

1. A method of controlling transmission power in a CDMA mobile communication system wherein an uplink signal target SIR value that serves as the reference in closed-loop transmission power control is updated in a base transceiver station, said method comprising the steps of:

when a loss of synchronization of a user signal from a mobile station is detected, adding a predetermined step value ΔSIR to an uplink signal target SIR value that has been reported from a base station controller and making the result an uplink signal target SIR provisional value;

if this uplink signal target SIR provisional value is smaller than an uplink signal target SIR maximum value that has been set in advance, updating the uplink signal target SIR value that serves as the reference for closed-loop transmission power control to said uplink signal target SIR provisional value;

comparing said uplink signal target SIR provisional value with a value obtained by adding the uplink signal target SIR value (RNC: Radio Network Controller) that is set from said base station controller to a threshold value α that has been set in advance;

transmitting an uplink signal target SIR value update message to said base station controller when said uplink signal target SIR provisional value is greater than the value obtained by adding the uplink signal target SIR value (RNC) that was set from said base station controller to threshold value α; and upon receiving an uplink signal target SIR value report message from said base station controller, updating the uplink signal target SIR value that serves as the reference in closed-loop transmission power control to a new uplink signal target SIR value (RNC) that has been reported by means of the uplink signal target SIR value report message.

2. A base transceiver station for implementing closed-loop transmission power control using an uplink signal target SIR value that is reported from a base station controller as reference, said base transceiver station comprising:

a synchronization loss detection means for detecting loss of synchronization of a user signal from a mobile station; and an updating means for adding a step value ΔSIR that has been set in advance to the uplink signal target SIR value that has been reported from said base station controller to obtain an uplink signal target SIR provisional value when said synchronization loss detection means detects loss of synchronization, and when said uplink signal target SIR provisional value is smaller than an uplink signal target SIR maximum value that has been set in advance, updating the uplink signal target SIR value that serves as the reference in closed-loop transmission power control to said uplink signal target SIR provisional value, wherein said updating means comprises:

a means for comparing said uplink signal target SIR provisional value with a value that is obtained by adding the uplink signal target SIR value (RNC) that is set from said base station controller to a threshold value a that has been set in advance;

a means for sending an uplink signal target SIR value update message to said base station controller when said uplink signal target SIR provisional value is greater than said added value; and a means for updating the uplink signal target SIR value that serves as the reference in closed-loop transmission power control to a new uplink signal target SIR value (RNC) that has been reported by the uplink signal target SIR value report message, upon receiving an uplink signal target SIR value report message from said base station controller.

3. A CDMA communication system provided with at least one mobile station that communicates with a base transceiver station via radio signals, a base station controller for controlling base transceiver stations, and a base transceiver station for implementing closed-loop transmission power control using, as a reference, an uplink signal target SIR value that has been reported from said base station controller, wherein said base transceiver station comprises:

a means for adding a step value ΔSIR that has been set in advance to the uplink signal target SIR value that has been reported from said base station controller and uses the result as an uplink signal target SIR provisional value, when a loss of synchronization of a user signal from said mobile station is detected; and a means for updating the uplink signal target SIR value that serves as a reference in closed-loop transmission power control to said uplink signal target SIR provisional value, when this uplink signal target SIR provisional value is smaller than an uplink signal target SIR maximum value that has been set in advance;

a means for comparing said uplink signal target SIR provisional value with a value obtained by adding an uplink signal target SIR value (RNC) that has been set from said base station controller and a threshold value cc that has been set in advance; a means for sending an uplink signal target SIR value update message to said base station controller when said uplink signal target SIR provisional value is greater than said added value; and a means for updating the uplink signal target SIR value that serves as the reference of closed-loop transmission power control to a new uplink signal target SIR value (RNC) that has been reported in the uplink signal target SIR value report message, when an uplink signal target SIR value report message from said base station controller is received.

* * * * *